United States Patent
Nie et al.

(10) Patent No.: US 11,394,705 B2
(45) Date of Patent: Jul. 19, 2022

(54) SYSTEMS AND METHODS FOR VERIFYING CREDENTIALS TO PERFORM A SECURED OPERATION IN A CONNECTED SYSTEM

(71) Applicant: Ademco Inc., Golden Valley, MN (US)

(72) Inventors: Liu Nie, Shanghai (CN); Kent Hu, Shanghai (CN); Guopeng Ren, Shanghai (CN)

(73) Assignee: Ademco Inc., Golden Valley, MN (US)

( * ) Notice: Subject to any disclaimer, the term of this patent is extended or adjusted under 35 U.S.C. 154(b) by 392 days.

(21) Appl. No.: 16/031,123

(22) Filed: Jul. 10, 2018

(65) Prior Publication Data

US 2020/0021580 A1    Jan. 16, 2020

(51) Int. Cl.
*H04L 9/40* (2022.01)
*G06V 40/16* (2022.01)

(52) U.S. Cl.
CPC ........ *H04L 63/0861* (2013.01); *G06V 40/167* (2022.01); *G06V 40/172* (2022.01); *H04L 63/10* (2013.01)

(58) Field of Classification Search
CPC ............... H04L 63/0861; H04L 63/10; H04L 2463/082; H04L 63/102; G06K 9/00288; G06K 9/00261; G06K 9/22; G06V 40/167; G06V 40/172; G06V 10/17
See application file for complete search history.

(56) References Cited

U.S. PATENT DOCUMENTS

| | | | |
|---|---|---|---|
| 8,836,467 B1 * | 9/2014 | Cohn ..................... | G08B 25/10 340/3.32 |
| 9,294,438 B2 | 3/2016 | Greer et al. | |
| 9,430,629 B1 * | 8/2016 | Ziraknejad ............ | G06F 16/583 |
| 9,485,655 B1 * | 11/2016 | Pirrotta .................... | G06F 21/81 |
| 10,360,744 B1 * | 7/2019 | Kerzner ................ | G06Q 50/163 |

(Continued)

FOREIGN PATENT DOCUMENTS

| | | |
|---|---|---|
| CN | 103327019 A | 9/2013 |
| WO | WO 2015/122789 A1 | 8/2015 |
| WO | WO 2015/157353 A1 | 10/2015 |

OTHER PUBLICATIONS

English language translation of abstract, claims, and description of CN103327019 (A).

(Continued)

*Primary Examiner* — Michael Simitoski
*Assistant Examiner* — Hany S. Gadalla
(74) *Attorney, Agent, or Firm* — Fredrikson & Byron, P.A.

(57) ABSTRACT

Systems and methods for verifying credentials to perform a secured operation in a connected system are provided. Such systems and methods may include a cloud server determining whether a face in an image and an activation code valid or invalid. When the cloud server determines that both the face in the image and the activation code are valid, systems and methods may include the cloud server transmitting an instructional signal to the connected system to execute the secured operation. However, when the cloud server determines that the face in the image is invalid, the activation code is invalid, or the image fails to include the face, systems and methods can include the cloud server refraining from transmitting the instructional signal to the connected system to execute the secured operation.

17 Claims, 2 Drawing Sheets

(56) References Cited

U.S. PATENT DOCUMENTS

| | | | |
|---|---|---|---|
| 2002/0095586 A1* | 7/2002 | Doyle | G06F 21/32 |
| | | | 713/186 |
| 2013/0167212 A1* | 6/2013 | Azar | G06F 21/32 |
| | | | 726/7 |
| 2013/0225129 A1* | 8/2013 | Norbisrath | H04W 12/065 |
| | | | 455/411 |
| 2015/0058447 A1* | 2/2015 | Albisu | G06F 21/32 |
| | | | 709/219 |
| 2016/0057365 A1* | 2/2016 | Uosawa | A63F 13/10 |
| | | | 348/164 |
| 2016/0063235 A1 | 3/2016 | Tussy | |
| 2017/0039838 A1* | 2/2017 | Lee | H04W 4/02 |
| 2017/0264608 A1* | 9/2017 | Moore | H04W 12/06 |
| 2017/0372056 A1* | 12/2017 | Narasimhan | G06F 21/36 |
| 2018/0102045 A1* | 4/2018 | Simon | G08B 25/08 |
| 2018/0144615 A1* | 5/2018 | Kinney | G06K 9/00771 |
| 2018/0167386 A1* | 6/2018 | Bhatt | G06Q 20/354 |
| 2019/0034701 A1* | 1/2019 | Kerger | G06K 9/00268 |
| 2019/0080189 A1* | 3/2019 | Van Os | H04N 5/23216 |
| 2021/0051253 A1* | 2/2021 | Liu | H04N 5/2624 |

OTHER PUBLICATIONS

Deepak S et al., Face Recognition Using Cloud Based Security in Mobile Devices, International Journal of Innovative Research in Computer and Communication Engineering, vol. 3, Issue 6, Jun. 2015, pp. 5705-5713.
Applications—SkyBiometry—Cloud-based Face Detection and Recognition API, https://skybiometry.com/applications/, Sep. 1, 2017.
Face Recognition & Voice Authentication | BioID, https://www.bioid.com/, Sep. 1, 2017, © 2017—BioID.

* cited by examiner

SYSTEMS AND METHODS FOR VERIFYING CREDENTIALS TO PERFORM A SECURED OPERATION IN A CONNECTED SYSTEM

FIELD

The present invention relates generally to a connected system, such as a security system or a home automation system. More particularly, the present invention relates to systems and methods for verifying credentials to perform a secured operation in the connected system.

BACKGROUND

Known systems and methods for controlling a connected system may use mobile or remote interface devices for initiating secured operations in the connected system. However, known systems and methods verify user credentials using only a single layer of security, such as password verification, thereby leaving the connected system vulnerable to hacking and other infiltration methods. Indeed, known systems and method are especially susceptible to these types of risks because of the mobile nature of the mobile and remote interface devices.

In view of the above, there is a continuing, ongoing need for improved systems and methods.

DETAILED DESCRIPTION

Figure 1:
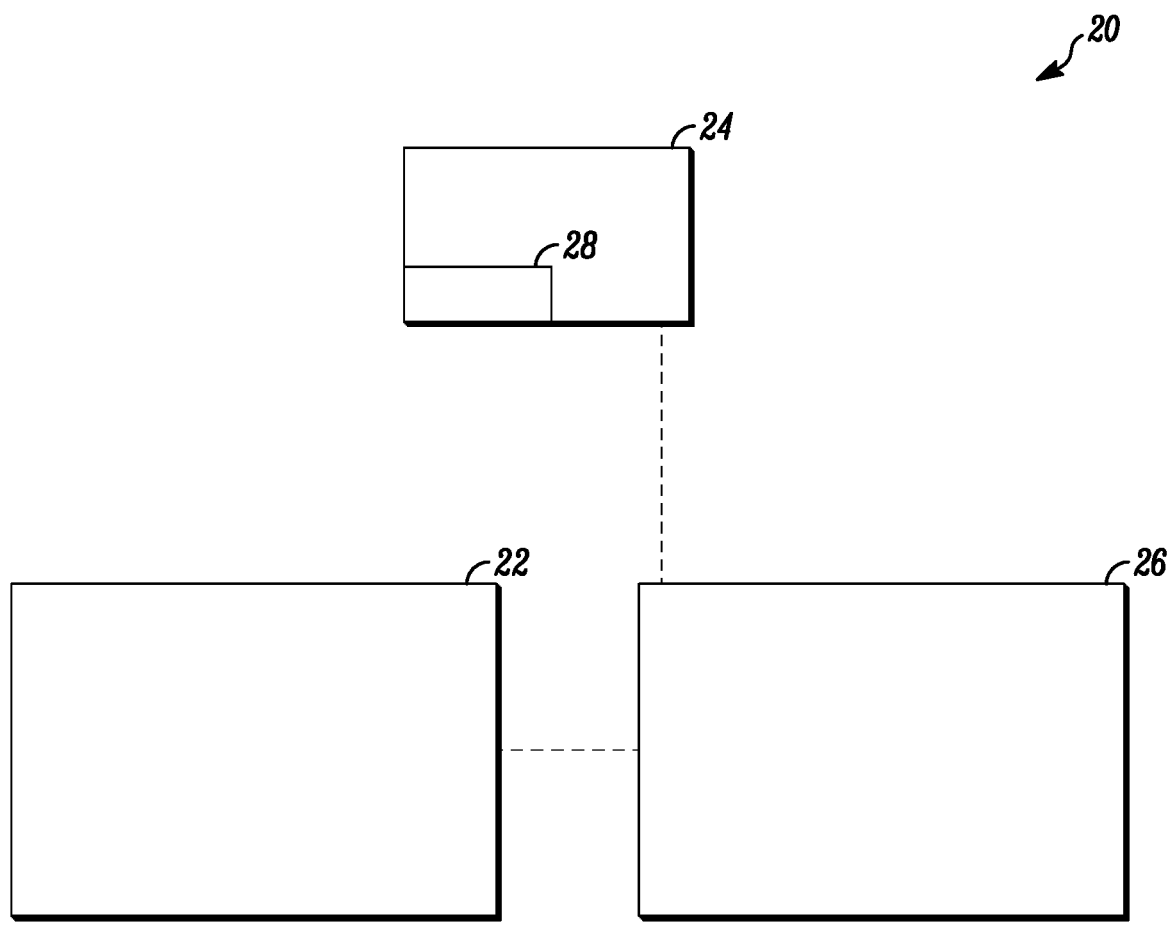
FIG. 1 is a block diagram of a verification system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein may include systems and methods for verifying credentials to perform a secured operation in a connected system. For example, systems and methods disclosed herein may determine whether both a face in an image and an activation code received by a cloud server from a mobile interface device are valid or invalid.

Systems and methods as disclosed herein are described in connection with a verification system for connected systems, such as home automation systems and security systems. It is to be understood that such systems may include, but are not limited to systems that include the cloud server, the mobile interface device communicating with the cloud server, and a connected system controlled by the mobile interface device via the cloud server.

In accordance with disclosed embodiments, the mobile interface device may receive first user input indicative of a request to perform the secured operation in the connected system and, responsive thereto, systems and methods disclosed herein can execute an enhanced verification procedure as disclosed herein. In some embodiments, systems and methods disclosed herein can execute the enhanced verification procedure disclosed herein responsive to the request to perform the secured operation when the secured operation has been previously identified as one of a plurality of high level verification operations. Additionally or alternatively, in some embodiments, systems and methods disclosed herein can execute the enhanced verification procedure disclosed herein responsive to the request to perform any secured operation in the connected system. In some embodiments, the secured operation may include arming the connected system, disarming the connected system, or programing the connected system.

Responsive to the first user input and during the enhanced verification procedure disclosed herein, the mobile interface device may enter a facial recognition mode. In some embodiments, when in the facial recognition mode, the mobile interface device may activate a built-in camera to capture a first image of a field of view of the built-in camera and identify a presence of a face or an absence of the face in the first image. When the mobile interface device identifies the absence of the face in the first image, the mobile interface device may terminate the facial recognition mode and refrain from transmitting or executing the request to perform the secured operation identified in the first user input. However, when the mobile interface device identifies the presence of the face in the first image, the mobile interface device may solicit second user input indicative of an activation code.

In some embodiments, when in the facial recognition mode, the mobile interface device may activate the built-in camera to capture the first image of the field of view of the built-in camera and transmit the first image to the cloud server for identifying the presence of the face or the absence of the face in the first image. When the cloud server identifies the absence of the face in the first image, the cloud server device may instruct the mobile interface to terminate the facial recognition mode and refrain from transmitting or executing the request to perform the secured operation identified in the first user input. However, when the cloud server identifies the presence of the face in the first image, the cloud server can instruct the mobile interface device to solicit the second user input indicative of the activation code.

In some embodiments, when in the facial recognition mode, the mobile interface device may activate the built-in camera to capture the first image of the field of view of the built-in camera and solicit the second user input indicative the activation code regardless of any determination as to the presence of the face or the absence of the face in the first image.

In some embodiments, responsive to the first user input, the mobile interface device may solicit third user input accepting or rejecting the facial recognition mode. When the third user input accepts the facial recognition mode, the mobile interface device may enter the facial recognition mode. However, when the third user input rejects the facial recognition mode, the mobile interface device may refrain from entering the facial recognition mode and refrain from transmitting or executing the request to perform the secured operation identified in the first user input.

In some embodiments, the mobile interface device may initiate a timer upon entering the facial recognition mode and may identify the absence of the face in the first image when the mobile interface device fails to identify the presence of the face in the first image before the timer expires.

In accordance with disclosed embodiments, the mobile interface device may transmit the request to perform the secured operation, the first image, and the activation code to the cloud server, and the cloud server may determine whether the activation code and the face in the first image are valid or invalid. When both the activation code and the face in the first image are valid, the cloud server may transmit an instructional signal to the connected system to execute the secured operation. However, when at least one of the activation code and the face in the first image is invalid, the cloud server may refrain from transmitting the instructional signal to the connected system to execute the secured operation. In some embodiments, the cloud server may transmit an informational signal to the mobile interface indicative of whether or not the cloud server instructed the connected system to execute the secured operation.

In some embodiments, to determine whether the activation code is valid or invalid, the cloud server may compare the activation code to a preconfigured code stored in a memory of the cloud server. When the activation code matches the preconfigured code, the cloud server may determine that the activation code is valid, and when the activation code fails to match the preconfigured code, the cloud server may determine that the activation code is invalid.

In some embodiments, to determine whether the face in the first image is valid or invalid, the cloud server may compare the face in the first image to a second image of an authorized user stored in the memory of the cloud server. When the face in the first image matches the second image of the authorized user, the cloud server may determine that the face in the first image is valid, and when the face in the first image fails to match the second image of the authorized user, the cloud server may determine that the face in the first is invalid.

In some embodiments, to determine whether the activation code and the face in the first image are valid or invalid, the cloud server may compare the face in the first image to the second image of the authorized user to confirm that the face in the first image matches the second image of the authorized user and to identify the authorized user and may compare the activation code to the preconfigured code assigned to the authorized user. When the face in the first image matches the second image of the authorized user and the activation code matches the preconfigured code assigned to the authorized user, the cloud server may determine that the activation code is valid. However, when the face in the first image matches the second image of the authorized user, but the activation code fails to match the preconfigured code assigned to the authorized user, the cloud server may determine that the activation code is invalid.

In some embodiments, when the cloud server determines that the face in the first image and the activation code are valid, the cloud server may determine whether the authorized user is authorized for the secured operation.

FIG. 1 is a block diagram of a verification system 20 in accordance with disclosed embodiments. As seen in FIG. 1, the verification system 20 may include a connected system 22, a mobile interface device 24 with a built-in camera 28, and a cloud server 26 coupled to mobile interface device 24 and the connected system 22.

Figure 2:
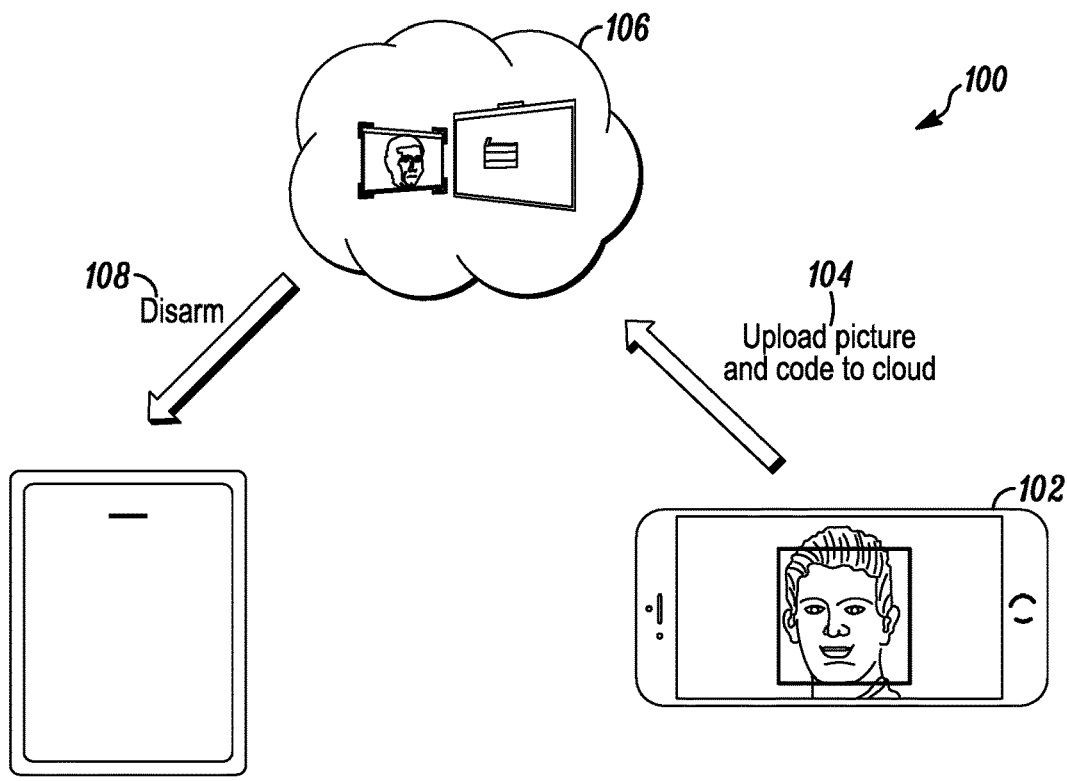
FIG. 2 is a flow diagram of a method in accordance with disclosed embodiments.

FIG. 2 is flow diagram of a method 100 in accordance with disclosed embodiments. The method 100 may include the mobile interface device 24 receiving an activation code and using the built-in camera 28 to capture an image of a field of view of the built-in camera 28, as in 102. The method 100 may also include the mobile interface device 24 transmitting or uploading a request to perform a secured operation, the image, and the activation code to the cloud server 26, as in 104, and the cloud server 26 determining whether a face in the image and the activation code are valid, as in 106. As seen in FIG. 2, when the cloud server determines that both the face in the image and the activation code are valid, the cloud server 26 may transmit a command to the connected system 22 to execute the secured operation, such as disarming the connected system 22, as in 108.

Figure 3:
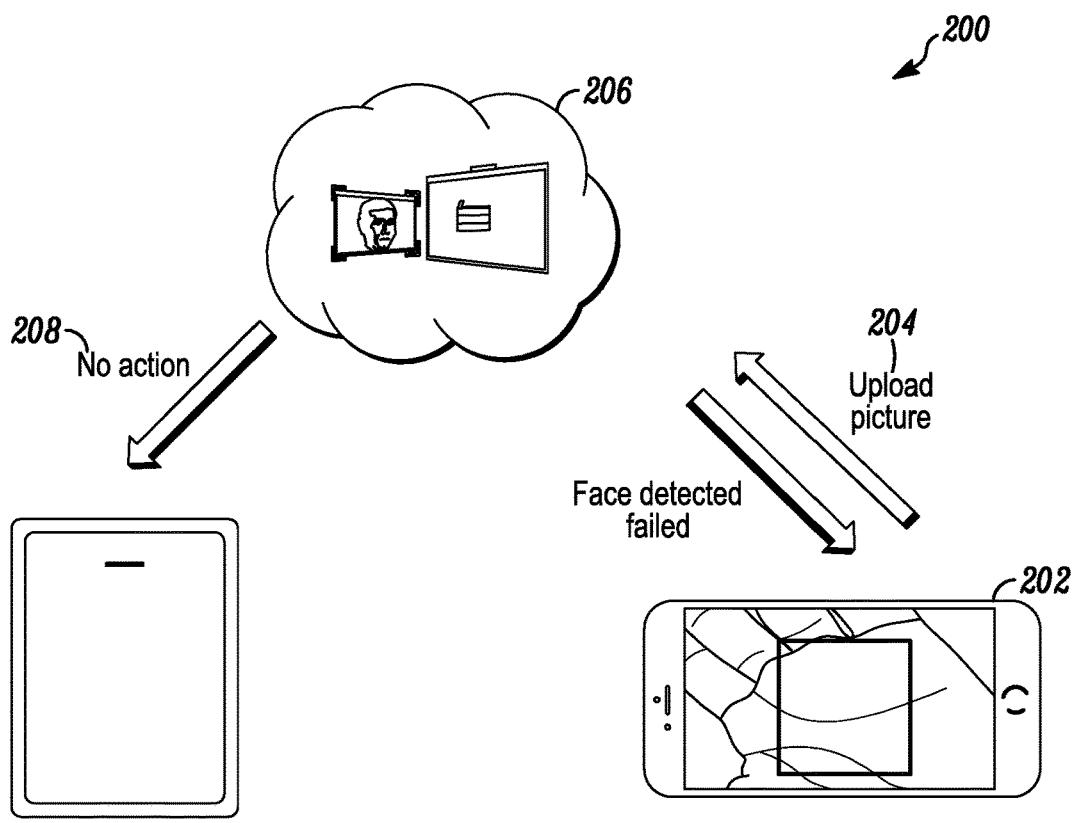
FIG. 3 is a flow diagram of a method in accordance with disclosed embodiments.

FIG. 3 is flow diagram of a method 200 in accordance with disclosed embodiments. The method 200 can include the mobile interface device 24 receiving the activation code and using the built-in camera 28 to capture the image of the field of view of the camera 28, as in 202. The method 200 may also include the mobile interface device 24 transmitting or uploading the request to perform the secured operation, the image, and the activation code to the cloud server 26, as in 204, and the cloud server 26 determining whether the face in the image and the activation code are valid, as in 206. As seen in FIG. 3, when the cloud server determines that the face in the image is invalid, that the image fails to include any face, or that the activation code is invalid, the cloud server 26 may refrain from transmitting the command to the connected system 22 to execute the secured operation, as in 208.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
a mobile interface device receiving first user input indicative of a request to perform a secured operation in a connected system, wherein the connected system comprises a home automation system or a home security system, and wherein the request to perform the secured operation comprises a request to arm the connected system or disarm the connected system;
responsive to the request to perform the secured operation, the mobile interface device activating a camera to capture a first image of a field of view of the camera;
initiating a timer at the mobile interface device responsive to activating the camera, and identifying, at least in part via a cloud server, an absence of a face in the first image when failing to identify the presence of the face in the first image prior to the timer expiring;
responsive to the request to perform the secured operation and identifying the absence of the face in the first image, refraining, at least in part via the cloud server, from transmitting the request to perform the secured operation;
responsive to the request to perform the secured operation and identifying, at least in part via the cloud server, a presence of a face in the first image, soliciting, at least in part via the cloud server, second user input indicative of an activation code;
the mobile interface device transmitting the request to perform the secured operation, the first image, and the activation code to the cloud server;
responsive to both the activation code and a face in the first image being valid, the mobile interface device receiving a first informational signal from the cloud server confirming that the cloud server transmitted a first instructional signal to the connected system to execute the secured operation; and responsive to the activation code being invalid or the face in the first image being invalid, the mobile interface device receiving a second informational signal from the cloud server confirming that the cloud server refrained from transmitting the first instructional signal to the connected system to execute the secured operation.

2. The method of claim 1 wherein the mobile interface device identifies the presence of the face in the first image and further comprising the mobile interface device identifying the absence of the face in the first image.

3. The method of claim 2 wherein the mobile interface device initiates the timer responsive to activating the camera, and wherein the mobile interface device identifies the absence of the face in the first image when the mobile device fails to identify the presence of the face in the first image prior to the timer expiring.

4. The method of claim 1 further comprising:
the mobile interface device transmitting the first image to the cloud server; and
responsive to the presence of the face in the first image, the mobile interface device receiving a second instructional signal from the cloud server to solicit the second user input.

5. The method of claim 1 further comprising, responsive to detecting the first user input, the mobile interface device soliciting second user input accepting or activating the camera.

6. A method comprising:
a cloud server receiving a request to perform a secured operation in a connected system, a wherein the connected system comprises a home automation system or a home security system, and wherein the request to perform the secured operation comprises a request to arm the connected system or disarm the connected system;
in response to receiving the request to perform the secured operation, the cloud server receiving a first image;
in response to receiving the request to perform the secured operation and the first image, the cloud server identifying an absence of a face in the first image responsive to a timer, which is initiated in response to activation of a camera at a mobile interface device, expiring and, as a result, the cloud server refraining from executing the request to perform the secured operation;
in response to receiving the request to perform the secured operation and the cloud server identifying a presence of a face in the first image, the cloud server receiving an activation code from the mobile interface device;
the cloud server determining whether both the first image and the activation code are valid;
when both the first image and the activation code are valid, the cloud server transmitting a first instructional signal to the connected system to execute the secured operation; and
when at least one of the first image and the activation code is invalid, the cloud server refraining from transmitting the first instructional signal to the connected system to execute the secured operation.

7. The method as claim 6 further comprising:
responsive to identifying the presence of the face in the first image, the cloud server transmitting a second instructional signal to the mobile interface device to solicit the activation code.

8. The method of claim 6 further comprising:
the cloud server comparing the activation code to a preconfigured code stored in a memory of the cloud server;
when the activation code matches the preconfigured code, the cloud server determining that the activation code is valid; and
when the activation code fails to match the preconfigured code, the cloud server determining that the activation code is invalid.

9. The method of claim 6 further comprising:
the cloud server comparing a face in the first image to a second image of an authorized user stored in a memory of the cloud server;
when the face in the first image matches the second image of the authorized user, the cloud server determining that the face in the first image is valid; and
when the face in the first image fails to match the second image of the authorized user, the cloud server determining that the face in the first image is invalid.

10. The method of claim 9 further comprising:
the cloud server comparing the activation code to a preconfigured code assigned to the authorized user stored in the memory of the cloud server;
when the activation code matches the preconfigured code assigned to the authorized user, the cloud server determining that the activation code is valid; and
when the activation code fails to match the preconfigured code assigned to the authorized user, the cloud server determining that the activation code is invalid.

11. The method of claim 9 further comprising, when the face in first image matches the second image of the authorized user, the cloud server determining whether the authorized user is authorized for the secured operation.

12. A system comprising:
a mobile interface device; and
a cloud server;
wherein the mobile interface device receives first user input indicative of a request to perform a secured operation in a connected system, wherein the connected system comprises a home automation system or a home security system, and wherein the request to perform the secured operation comprises a request to arm the connected system or disarm the connected system,
wherein, responsive to the request to perform the secured operation, the mobile interface device activates a camera to capture a first image of a field of view of the camera,
wherein, responsive to activating the camera, the mobile interface device initiates a timer and an absence of a face in the first image is identified, at least in part via the cloud server, when failing to identify the presence of the face in the first image prior to the timer expiring,
wherein, responsive to the request to perform the secured operation and identifying the absence of the face in the first image, refraining, at least in part via the cloud server, from transmitting the request to perform the secured operation,
wherein, responsive to the request to perform the secured operation and identifying, the least in part via the cloud server, a presence of a face in the first image, soliciting, at least in part via the cloud server, second user input indicative of an activation code,
wherein the mobile interface device transmits the request to perform the secured operation, the first image, and the activation code to the cloud server, wherein the cloud server determines whether the activation code and the face in the first image are valid, wherein, when both the activation code and the face in the first image are valid, the cloud server transmits an instructional signal to the connected system to execute the secured operation, and wherein, when at least one of the activation code and the face in the first image is invalid, the cloud server refrains from transmitting the instructional signal to the connected system to execute the secured operation, and wherein, when at least one of the activation code and the face in the first image is invalid, the cloud server sends a second information signal to the mobile interface device confirming that the cloud server refrained from transmitting the first instructional signal to the connected system to execute the secured operation.

13. The system of claim 12 further wherein the cloud server compares the activation code to a preconfigured code stored in a memory of the cloud server, wherein, when the activation code matches the preconfigured code, the cloud server determines that the activation code is valid, and wherein, when the activation code fails to match the preconfigured code, the cloud server determines that the activation code is invalid.

14. The system of claim 12 wherein the cloud server compares the face in the first image to a second image of an authorized user stored in a memory of the cloud server, wherein, when the face in the first image matches the second image of the authorized user, the cloud server determines that the face in the first image is valid, and wherein, when the face in the first image fails to match the second image of the authorized user, the cloud server determines that the face in the first image is invalid.

15. The system of claim 14 wherein the cloud server compares the activation code to a preconfigured code assigned to the authorized user stored in the memory of the cloud server, wherein, when the activation code matches the preconfigured code assigned to the authorized user, the cloud server determines that the activation code is valid, and wherein, when the activation code fails to match the preconfigured code assigned the authorized user, the cloud server determines that the activation code is invalid.

16. The system of claim 14 wherein, when the face in the first image matches the second image of the authorized user, the cloud server determines whether the authorized user is authorized for the secured operation.

17. The system of claim 12 wherein the cloud server determines that the face in the first image is invalid when the first image fails to include the face.

\* \* \* \* \*